Jan. 26, 1954
B. F. PARR
2,667,116
TOASTER APPARATUS
Filed Feb. 3, 1950
2 Sheets-Sheet 1
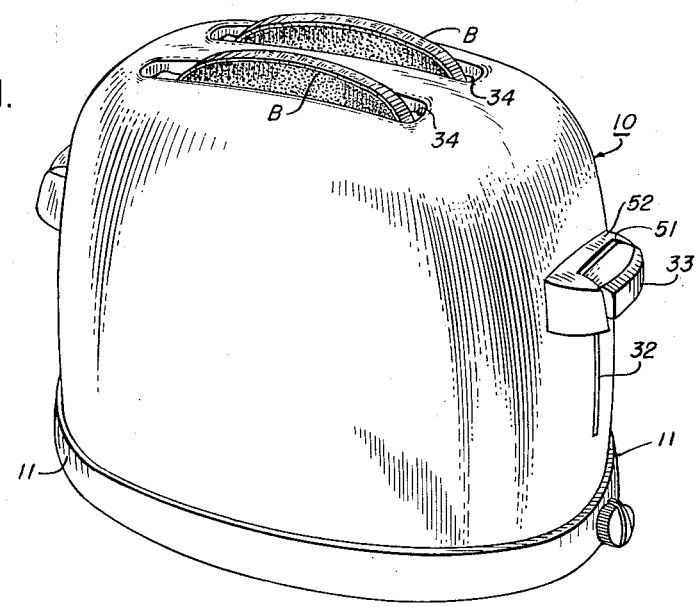
FIG. I.
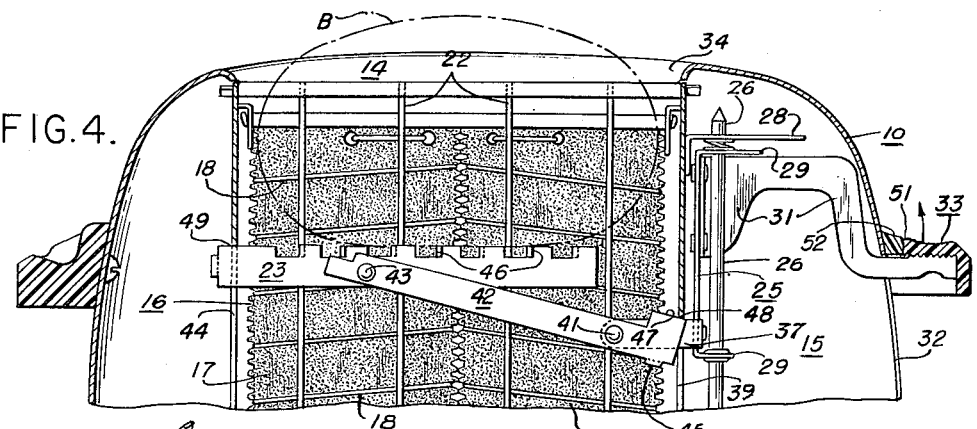
FIG. 4.
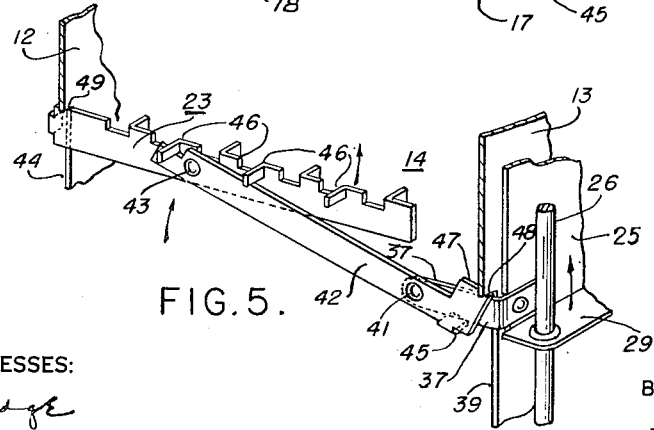
FIG. 5.
WITNESSES:
INVENTOR
BERNARD F. PARR
BY
ATTORNEY Jan. 26, 1954 B. F. PARR 2,667,116
TOASTER APPARATUS
Filed Feb. 3, 1950 2 Sheets-Sheet 2

WITNESSES:
R.A. Ridge
D. J. McCarty

INVENTOR
BERNARD F. PARR
BY
ATTORNEY

Patented Jan. 26, 1954

2,667,116

UNITED STATES PATENT OFFICE 2,667,116

TOASTER APPARATUS

Bernard F. Parr, Mansfield, Ohio, assignor to Westinghouse Electric Corporation, East Pittsburgh, Pa., a corporation of Pennsylvania Application February 3, 1950, Serial No. 142,331

4 Claims. (Cl. 99—391)

My invention relates to toasting apparatus of the so-called "pop-up" type and has for an object to provide improved apparatus of this kind.

A further object of the invention is to facilitate the removal of relatively small size slices of toast from a toaster of the type set forth and wherein a substantial portion of both small and large size slices are retained in the oven after the toasting operation is completed in order to maintain the slices warm.

Domestic toasters of the so-called "pop-up" type include an oven structure within a casing in which a slice carrier is arranged for vertical movement between an upper slice receiving position and a lower toasting position. A handle is provided exteriorly of the casing for depressing the carrier to its toasting position after the slice to be toasted is deposited on the carrier through an access opening in the top of the casing. After a period of toasting, the carrier is automatically returned to the upper or slice receiving position. In the latter position, the toasted slice is partially projected through the opening where it may be grasped and removed. In the interest of maintaining the toast warm for a period, only a small portion of the slice is projected through the opening, which portion is sufficient to enable the operator to grasp the toast. If a small bun or slice of bread, such as, for example, Vienna bread is toasted, it may not project from the casing and is difficult to remove. In accordance with my invention, means actuated by the handle is provided for elevating the carrier above its normal upper, slice receiving position in order to project small size pieces, as set forth, above the casing where they may be conveniently lifted from the carrier. Preferably, a movement multiplying mechanism is employed between the handle and carrier for elevating the latter in response to a small amount of upward movement of the handle above its upper slice receiving position.

The foregoing and other objects are effected by my invention as will be apparent from the following description and claims taken in connection with the accompanying drawings, forming a part of this application, in which:

Fig. 1 is a perspective view of one form of toaster constructed and arranged in accordance with my invention;

Fig. 4 is a section similar to the upper portion of Fig. 2 and showing certain elements of the toaster in a different position; and Fig. 5 is a perspective showing portions of the toaster and slice carrying members in the position thereof as illustrated in Fig. 4.

Figure 2:
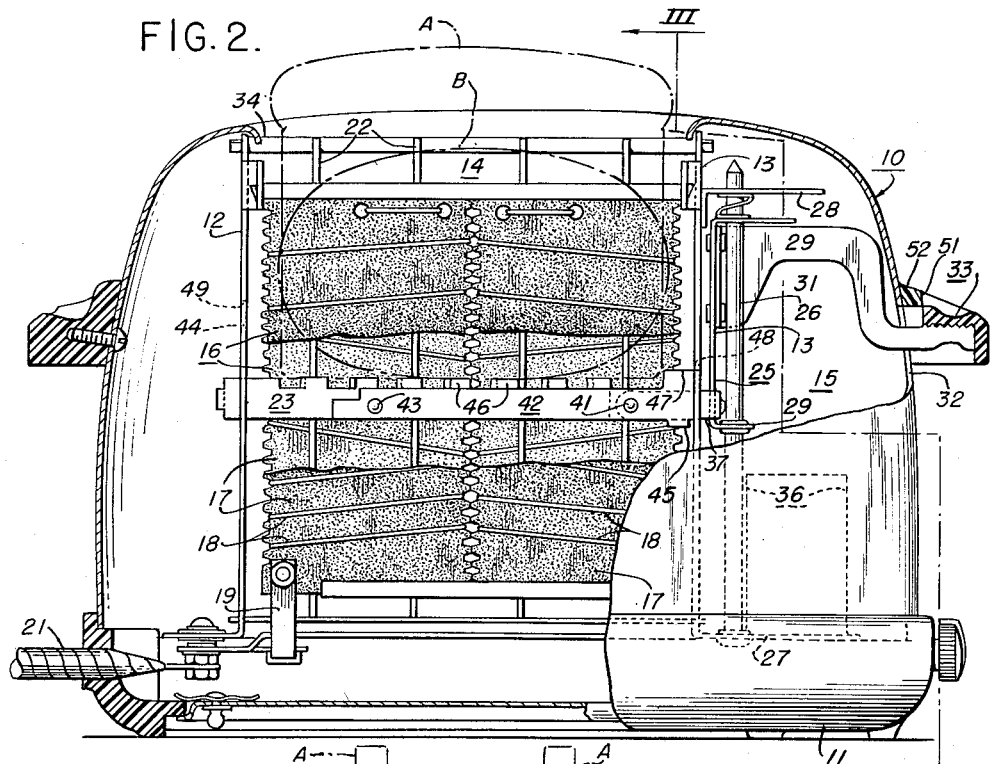
Fig. 2 is a vertical, longitudinal section taken through the toaster of Fig. 1, a portion of the casing being shown in elevation.

Reference will now be had to the drawings wherein I have elected to disclose my invention applied to a domestic toaster of the so-called "pop-up" type which includes a shell or casing 10 suitably supported on a base 11 which may be molded plastic. Arranged within the casing 10 are longitudinally spaced and vertically extending partitions 12 and 13 which define a toasting oven, generally indicated at 14, and a compartment 15, the latter housing the operating mechanism of the toaster. A plurality of heating elements, usually four in number in a two slice toaster as shown, are indicated at 16 and are transversely spaced within the oven 14 for radiantly heating the material to be toasted. The heating elements may include strips of mica 17 having heating elements 18 wound thereon and connected with suitable terminals one of which is indicated at 19. The terminals are connected in any well understood manner to a service cord 21 which is connectable to an electric circuit, not shown. Vertical guard wires 22 are employed for retaining the bread slices in a vertical position within the oven 14.

Slices to be toasted are supported within the oven 14 by slice carriers 23 and 24. These carriers are supported in a manner to be described hereinafter by a carriage 25 which is movable upwardly and downwardly in the compartment 15 upon slide rods 26. The slide rods 26 are secured adjacent their lower ends in any suitable manner to a horizontal flange 27 which may form a part of the partition 13 and the upper ends of the slide rods 26 are positioned within an upper horizontal flange 28 which is secured to the partition 13. As shown, the carriage 25 has horizontally extending portions 29 provided with openings through which the rods 26 project. An arm 31 is fixed in any suitable manner to the carriage 25 and extends through a slot 32 in an end of the casing 10, which arm 31 is provided with a suitable handle 33 for the manual lowering of the carriage 25.

Figure 3:
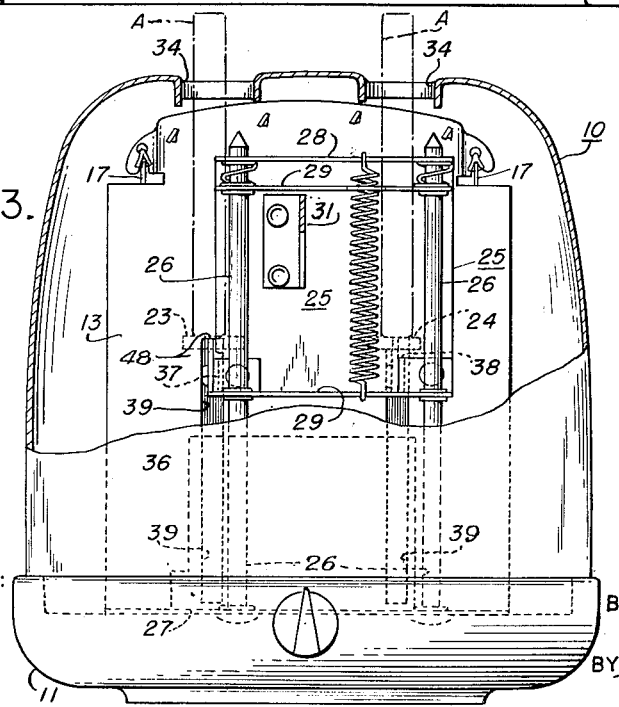
Fig. 3 is a transverse section taken along the line III—III of Fig. 2 with a portion of the casing shown in elevation.

The toaster shell 10 is provided with a pair of openings 34, best shown in Fig. 1, aligned above the carriers 23 and 24 through which the bread slices to be treated are inserted and withdrawn. In the operation of the toaster, as described up to the present, the bread slices are inserted through the openings 34 upon the carriers 23 and the handle 33 is depressed for lowering the carriage 25 and carriers 23 and 24 from an upper slice receiving position, as shown in Fig. 3, to a lower toasting position. In the latter position, the entire slice carried by the carriers is disposed within the oven 14. The carriage 25 is latched in its lower position for a predetermined period of time sufficient to carry out the toasting operation after which the carriage is released and a tension spring 35 returns the carrier to its upper slice receiving position, as shown. The mechanism for retaining the carriage 25 in its lower toasting position and for timing the period of toasting forms no part of the present invention and, in the interest of brevity, will not be described in detail. The latching and timing mechanism is generally indicated at 36 in the lower portion of the apparatus compartment 15. A suitable latching and timing mechanism is disclosed in the patent of Paul McCullough, No. 2,336,696, granted December 14, 1943.

In Fig. 2 of the drawings, the bread carrier is shown in its upper position or what is generally called the slice receiving position of the carrier. This is the position assumed when the toaster is inactive or after a toasting operation is completed. In this position of the carriers 23 and 24 it is desirable that a substantial portion of the slice being toasted be retained in the oven 14 in order to maintain the toast warm by the reheat of the toaster structure if the toast is not to be consumed immediately. In this connection, it will be understood that the heating elements of a toaster of the type disclosed are energized only during periods when the carriage 25 is disposed in its lower toasting position and are deenergized at other times. It will be noted that a conventional large slice of bread, as indicated by the broken line A, projects a small amount from the casing so that it may be grasped by the fingers and removed from the oven 14. However, a small bun or a slice of Vienna bread, as indicated by broken line B, remains entirely within the oven and cannot be readily removed.

In accordance with my invention, means is provided for elevating the carriers 23 and 24 and the carriage 25 above their upper position, as shown in Fig. 2, in order to project a portion of small slices above the casing 10 for the removal of such small slices. The means for carrying out this operation will now be described. As shown, a pair of arms 37 and 38 are associated, respectively, with the carriers 23 and 24 and are riveted or otherwise fixed to the carriage 25. These arms define supports for their respective carriers and, since the mechanisms associated with both carriers are substantial duplicates, only the mechanism supporting and actuating the carrier 23 will be described.

As best shown in Figs. 3 and 5, the arm 37 projects through an elongated slot 39 formed in the partition 13 and is provided at the end thereof within the oven 14 with a pivot pin 41. The latter pivotally supports a link 42 adjacent one of its ends and the link 42 is pivoted adjacent its other end, as shown at 43, to a portion of the carrier 23. From Figs. 2 and 5 it will be noted that one end of the carrier 23 extends through a second elongated slot 44 formed in the partition 12. In the position of the apparatus, as shown in Fig. 2, the link 42 is maintained in a generally horizontal position by a finger 45 which is integral with the link 42 and which extends beneath the arm 37. In this position of the apparatus, the carrier 23 is maintained generally horizontal by a plurality of fingers 46 formed thereon which engage the upper side of the link 42, it being understood that the carrier 23 due to its pivotal connection with the link 42, is biased by gravity in clockwise direction, as viewed in Fig. 2. At this point, it is also pointed out that the fingers 46 of the carrier 23 also serve to support the bread slices placed thereon. The link 42 is also provided with an abutment 47 which in the position of the apparatus, as shown in Fig. 2, is just below but adjacent the upper end of the slot 39, which I am designating a stop 48. It will also be noted that the end of the carrier 23, which projects through the partition 12, is spaced below the upper end of its slot 44, which I will also refer to as a stop 49. See Figs. 2 and 5. In order to raise the carrier 23 for the removal of small slices being toasted, the handle 33, the carriage 25 and, therefore, the arm 37 are raised manually and, accordingly, the pivot 41 swings the link 42 about the stop 48 as a pivot. This upward movement of the link 43 raises the carrier 23 until the end thereof engages the stop 49 in partition 12, after which the carrier 23 swings counterclockwise about the stop 49 to a generally horizontal position as indicated in Figs. 4 and 5. Accordingly, the small size slices carried by the carrier 23 are projected upwardly above the top side of the casing 10, as indicated in Fig. 4, and may be readily grasped and removed. The position of the handle 33 in the elevated position of the carrier 23 is shown in Fig. 4. After the removal of the small slices from the carrier 23 and the removal of upward pressure on the handle 33 the various elements of the bread supporting structure return by gravity to the position shown in Fig. 2.

As best shown in Figs. 1, 2 and 4, the handle 33, in the upper and the elevated position of the carriers 23 and 24 just described, is disposed in a recess 51 formed in a thumb rest 52 which is fixed to the casing 10 in a suitable manner. By resting the thumb on the rest 52 and lifting the handle 33 with a finger from the position of the handle shown in Fig. 2 to the position shown in Fig. 4, the carriers 23 and 24 are elevated to the position shown in Figs. 4 and 5. The greater movement of the carriers 23 and 24 relative the movement of the handle is, of course, due to the movement multiplying function of the described supporting means of the carriers.

From the foregoing description, it will be apparent that I have provided an improved toaster wherein a substantial portion of the toasted material may be retained within the oven for maintaining the material warm and wherein small size portions of material being toasted may be elevated from the oven to facilitate their removal from the toaster.

While I have shown the invention in several forms, it will be obvious to those skilled in the art that it is not so limited, but is susceptible of various changes and modifications without departing from the spirit thereof.

What I claim is:

1. In a toaster, the combination of a shell having a pair of spaced partitions arranged therewithin for defining a toasting chamber and an apparatus compartment within the shell, said shell having an opening in the upper side thereof for the passage of a bread slice to and from the oven, a carriage, means supporting the carriage within said compartment and providing for upward and downward movement of the carriage, a handle construction extending through the shell and movable downwardly for actuating the carriage from an upper slice receiving position to a lower toasting position, means for returning the carriage to its upper slice receiving position at the conclusion of the toasting operation, a slice carrier disposed within said oven, one of said partitions having an elongated slot formed therein, an arm carried by said carriage and extending through said slot, a link pivoted at one end to said carrier and at its opposite end to said arm, means for retaining said carrier in a generally horizontal position during movement of the carriage between its upper and lower positions, said carriage being additionally movable by said handle upwardly from the upper slice receiving position thereof to a third position, and a pair of stops carried by said partitions for respectively engaging said link and carrier during said additional upward movement of the carriage, the construction and arrangement being such that the carrier is elevated during said additional upward movement of the carriage for facilitating the removal of relatively small slices from the carrier.

2. In a toaster, the combination of a shell having a pair of spaced partitions arranged therewithin for defining a toasting chamber and an apparatus compartment within the shell, said shell having an opening in the upper side thereof for the passage of a bread slice to and from the oven, a carriage, means supporting the carriage within said compartment and providing for upward and downward movement of the carriage, a handle construction extending through the shell and movable downwardly for actuating the carriage from an upper slice receiving position to a lower toasting position, means for returning the carriage to its upper slice receiving position at the conclusion of the toasting operation, said partitions having respective elongated slots formed therein, an arm fixed to said carriage and extending through one of said slots, a slice carrier disposed in said oven and having an end thereof extending through another of said slots, a link pivoted to said carrier and to said arm for the support of said carrier, said link extending through said one slot, means associated with the link for retaining the link in a predetermined position within the oven during movement of the carriage between its upper slice receiving position and its lower toasting position, and means associated with said carrier for retaining the carrier on the link in generally horizontal position during said movement of the carriage, said carriage being additionally movable by the handle upwardly from the upper slice receiving position thereof to a third position, said link being engageable with the end of its respective slot during said additional movement of the handle for swinging the link upwardly about its pivotal connection with the arm and said carrier being engaged with the end of its respective slot for swinging the carrier upwardly about its pivotal connection with the link, the construction and arrangement being such that removal of a relatively small slice of bread from the carrier is facilitated in the elevated position thereof.

3. In a toaster, the combination of a casing having a toasting oven formed therewithin and provided with an opening for the passage of a bread slice to and from the oven, heating means arranged within the oven, a slice holder disposed within the oven, a carriage, means supporting the carriage within the casing and providing for upward and downward movement of the carriage, means for moving the carriage from an upper slice receiving position to a lower toasting position, means for raising the carriage from its lower toasting position to said upper position at the conclusion of the toasting period, motion multiplying linkage means connecting said slice holder to the carriage, said linkage means being ineffective to impart relative movement between the slice holder and the carriage when the carriage is moved between its slice receiving and toasting positions, a handle construction for moving the carriage upwardly from the slice receiving position thereof, and means positioned within said casing for engaging and rendering said linkage means effective to impart relatively upward movement to said slice holder with respect to said carriage when the carriage is moved upwardly from its slice receiving position.

4. In a toaster, the combination of a casing having a toasting oven formed therewithin and provided with an opening for the passage of a bread slice to and from the oven, heating means arranged within the oven, a slice holder disposed within the oven, a carriage, means supporting the carriage within the casing and providing for upward and downward movement of the carriage, means including a handle for moving the carriage from an elevated slice receiving position to a lower toasting position, said handle also being effective to move said carriage upwardly from the slice receiving position thereof, means for raising the carriage from its toasting position to its slice receiving position, motion multiplying linkage means connecting said slice holder to the carriage, said linkage means being ineffective to impart relative movement between the slice holder and the carriage when said carriage is moved between its slice receiving and toasting positions, and means positioned within said casing for engaging and rendering said linkage means effective to impart relative upward movement to said slice holder with respect to said carriage when said carriage is moved upwardly from its slice receiving position.

BERNARD F. PARR.

References Cited in the file of this patent

UNITED STATES PATENTS

| Number | Name | Date |
| --- | --- | --- |
| 1,876,901 | Forbes | Sept. 12, 1932 |
| 2,070,333 | Freeman | Feb. 9, 1937 |
| 2,262,280 | Gomersall | Nov. 11, 1941 |
| 2,288,699 | Gomersall et al. | July 7, 1942 |
| 2,288,713 | Ireland | July 7, 1942 |
| 2,416,014 | McCullough | Feb. 18, 1947 |

FOREIGN PATENTS

| Number | Country | Date |
| --- | --- | --- |
| 188,312 | Great Britain | Mar. 22, 1923 |